March 26, 1968 C. E. M. TIBBS 3,375,476

RADIOFREQUENCY HEATING APPARATUS

Filed Oct. 14, 1963 2 Sheets-Sheet 1

Inventor
Christopher E M Tibbs
By Kemon Palmer
Stewart & Estabrook
Attorneys

March 26, 1968 C. E. M. TIBBS 3,375,476

RADIOFREQUENCY HEATING APPARATUS

Filed Oct. 14, 1963 2 Sheets-Sheet 2

Inventor
Christopher E. M. Tibbs
By Kemon, Palmer, Stewart & Estabrook
Attorneys United States Patent Office 3,375,476

Patented Mar. 26, 1968

3,375,476

RADIOFREQUENCY HEATING APPARATUS

Christopher E. M. Tibbs, Wokingham, England, assignor to Radyne Limited, Wokingham, England, a British company Filed Oct. 14, 1963, Ser. No. 315,913
12 Claims. (Cl. 333—76)

ABSTRACT OF THE DISCLOSURE

In order to reduce the harmonic content of radiofrequency energy in the load circuit of industrial high frequency heating equipment, the oscillator is inductively coupled to the output circuit and the inductive coupling is screened by at least two successive shields of continuous conductive sheet material which form a tunnel around the inductive coupling member. These shields together with the inductive coupling member form an electrical capacitance and function as both an electrostatic and an electromagnetic screen. The relationship between the resonant frequency of the screen and the fundametal frequency of the equipment is such that magnetically induced voltages at harmonics of the fundamental are substantially reduced in amplitude over magnetically induced voltages at the fundamental frequency.

Radiofrequency generators of high frequency heating apparatus, in addition to producing the fundamental frequency signal which is to effect the heating of the workpiece, also produce a chain of unwanted harmonic frequency signals. It has been proposed to use low-pass filters in the output of the generator circuit or to use weak coupling between the load circuit and the oscillator circuit in order to reduce the level of the radiated harmonics. Most prior proposals have combined these two methods. However, these prior proposals are undesirable because a low pass filter will not match into a wide range of work impedances, as is usually required in practice, and unless of very large dimensions will not pass the heavy currents necessary when there is tight coupling between the work circuit and the pick-up coil and if there is only a weak coupling between the load circuit and the oscillator circuit, the power is mainly delivered in one short pulse to the workpiece as the resonant frequency of the work circuit passes through the oscillator frequency. This disadvantage applies particularly to plastic welding apparatus. This characteristic of the apparatus is an extremely undesirable one and it is an object of the present invention to reduce harmonic radiation levels without requiring the power to be delivered in one short pulse.

According to the present invention a coil inductively picking up electrical power from the radiofrequency generator of the equipment is shielded by a screen which comprises at least two successive shields forming an electrical capacitance and which modifies the magnetic field inducing the voltage in the pick-up coil so that the magnetically induced voltage at the harmonic frequencies is reduced in amplitude to a greater extent than the voltage induced at the fundamental frequency.

With this arrangement, the amount of coupling between the pick-up coil and the tank circuit can be increased sufficiently to enable the construction of plastic sheet welding equipment in which the work circuit resonant frequency does not have to pass through the oscillator frequency in order to make a satisfactory weld. This produces a more desirable welding characteristic as the power need no longer be delivered during one relatively short pulse, making easier the control of the power input delivered into the welding. Thus, the power is delivered over a longer period of time and in a less critical manner.

In the preferred form of the invention the output conductor from the pick-up coil is connected to a capacitor which provides a low reactance path to a screening casing enclosing the pick-up coil and a further inductance connects the live side of the capacitor to a further capacitor providing a low reactance path to the screening casing. In this apparatus the tank circuit is in the form of a cavity resonator. The resonant frequency of the pick-up coil and the first capacitor is preferably below that of the further inductance and the further capacitor and the resonant frequencies of both these combinations are below the fundamental frequency of the oscillator.

In order that the invention may be better understood one form of apparatus embodying the invention will now be described with reference to the accompanying drawings, in which.

Figure 1:
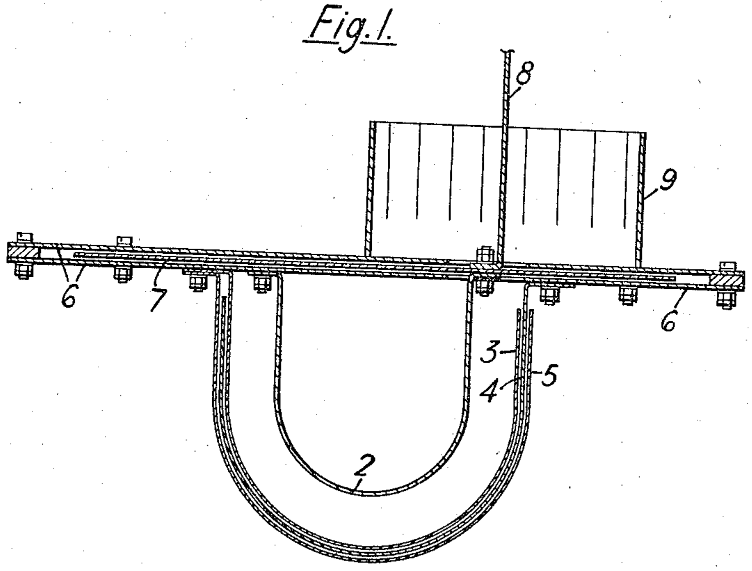
FIGURE 1 is an end view of the pick-up coil assembly.

In the apparatus shown in the drawings the cavity resonator 1 forms the tank circuit of a radiofrequency oscillator. Radiofrequency energy is delivered from the tank circuit to the output circuit by means of a pick-up coil 2 within the cavity resonator. The pick-up coil 2 is surrounded by a screen consisting of three plates 3, 4 and 5 which may be air-spaced or may be separated by a dielectric film and which are thus capacitively coupled to each other. Each of the plates 3, 4 and 5 is supported at one end on the lower of two earthed plates 6 and is free at its other end. Adjacent plates are supported at opposite ends. The pick-up coil is also connected at one end to the lower plate 6 and its other end passes through an aperture in this plate and is bolted to a live plate 7 lying between and parallel with the plates 6 and to an output connection 8 which extends from the other side of the live plate 7 and passes through an outlet duct 9. The live plate 7 is separated from each of the plates 6 by an elastomer sheet having a thickness of 0.030 inch.

Generally, the screen consisting of the plates 3, 4 and 5 should be considerably longer than the pick-up coil and the latter should occupy as much as is practicable of the cross-sectional area within the screen. In a typical example employing a cylindrical cavity resonator having a diameter of 32 inches and a height of 12½ inches the width of the pick-up coil was 6 inches and the earthed plates 6 had a length of 14 inches and a width of 12 inches. The live plate was 2 inches less in each direction than the earthed plates. It is desirable to make these plates as large as is practicable in order to obtain the desired capacitance since in some cases the use of additional plates to increase the capacitance can lead to further undesired resonances.

The screening assembly which has been described has an attenuation-frequency characteristic such that it provides increasing attenuation with increasing frequency of the signal which is being magnetically induced in the pick-up coil. It imposes very little attenuation on the fundamental frequency but in some cases provides an attenuation of considerably more than 20 db on harmonic frequencies of the order of the eighth to tenth harmonics for a working frequency of 27 mc./s. The screen inductance resonates with the screen capacitance between the plates 3, 4 and 5. Generally speaking, it is desirable for this resonance to occur between the fundamental frequency and the first of the harmonic frequencies. The screen will impose little attenuation at its resonant frequency or at frequencies below this but will have a short-circuiting effect on the magnetic field at frequencies above resonance. However, the resonant frequency of the screen is not unduly critical and its effect will not be very great if most of the capacitive reactance is cancelled by the inductance of the screen. In some cases it may be desirable for the resonant frequency of the screen to occur at a frequency approximating to the fundamental or even at a frequency somewhat below that of the fundamental.

Figure 3:
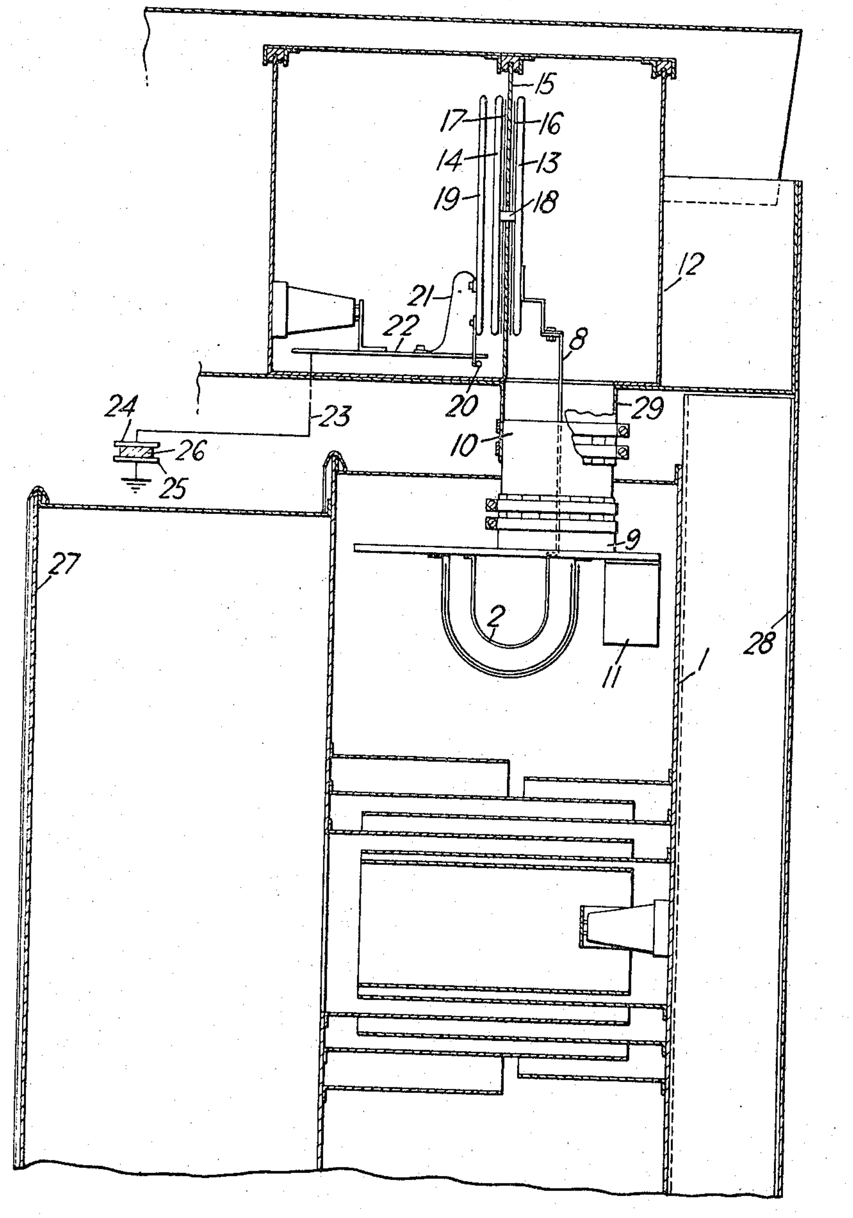
FIGURE 3 shows the pick-up coil assembly within a cavity resonator, together with the output circuit connected to the pick-up coil.

As shown in FIGURE 3 the assembly consisting of the plates 6 and 7 is supported within the cavity 1 by means of a bracket 11 which rests on an insulator (not shown). The duct 9 is connected by means of a short tube 10 to a further duct 29 on a screened output compartment 12. The tube 10 passes through the side of the cavity. The output conductor 8, which at the frequency at which the apparatus is designed to work constitutes an inductance, leads to the first of two capacitor plates 13 and 14. These plates are arranged parallel to one another one on each side of a plate 15 connected to the screening compartment 12 and are separated from the plate 15 by means of layers of insulating material 16 and 17. The plates 13 and 14 are electrically interconnected by means of a conductive stub 18 passing through a clearance hole in the layers 15, 16 and 17. The plates 13 and 14 are thus both live and each forms a capacitor with the earthed plate 15.

The plate 14 also forms one electrode of an output capacitor the other electrode of which is constituted by a further plate 19 which is mounted on a pivot 20 and the angular movement of which about this pivot varies the output capacitance to tune the work circuit. The plate 19 of the adjustable capacitor is connected by means of a flexible strip 21 to a plate 22 from which an output connection 23 extends to the heating electrodes 24 and 25 between which is placed the load 26 to be heated.

The cavity 1, the output compartment 12 and the compartment 27 housing the oscillator components are contained within a cubicle 28.

In the apparatus described the resonant frequency of the pick-up coil 2 and the capacitance formed by the plates 6 and 7 was below that of the further inductance constituted by the output conductor 9 and the capacitance formed by the plates 13 and 14 with the earthed plate 15. Both of these resonant frequencies were below the fundamental frequency of the oscillator.

With the arrangement described the amount of coupling between the pick-up coil and the tank circuit can be increased to such a value that the work circuit resonant frequency of plastic sheet welding equipment does not have to pass through the oscillator frequency in order to make a satisfactory weld. This produces a more desirable welding characteristic as the power need no longer be delivered during one relatively short pulse and this facilitates the control of the power input for the welding operation. The circuit shown has a very high harmonic rejection ratio.

If desired, the attenuation of the second and third harmonics may be even further improved by adding two circuits which are series resonant at the second and third harmonic frequencies respectively, between the capacity plate 13 and the screening case 12.

Figure 2:
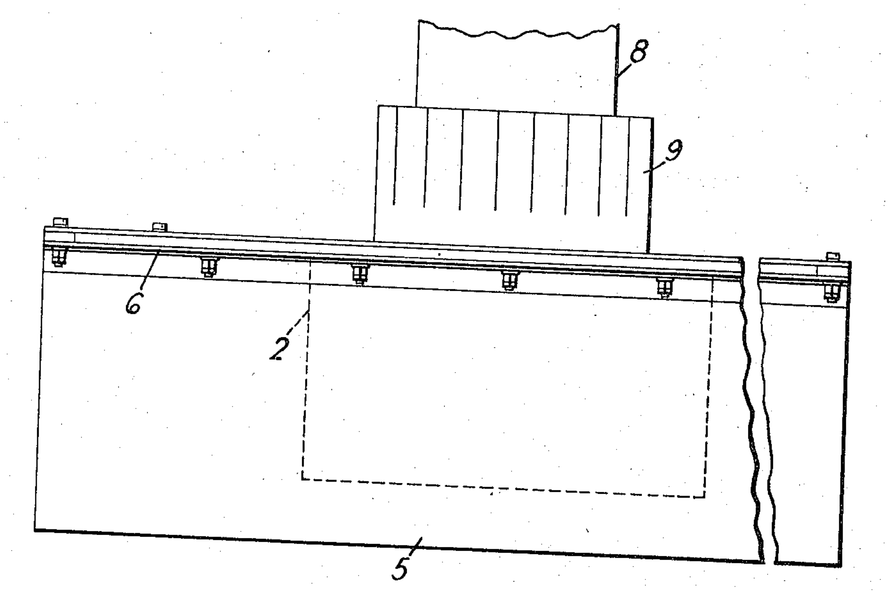
FIGURE 2 is a side view of this assembly.

Multi-turn pick-up coils or a number of pick-up coils may in some cases be used and Faraday screens in the form of wire grids may be arranged at each end of the screen shown in FIGURES 1 and 2. Alternatively sheet metal high conductivity screens may close off the ends of the screen thus intercepting both capacitative and inductive stray coupling by way of the otherwise open ends of the screen.

If solid dielectric insulation is used between the plates 3, 4 and 5 to reduce the resonant frequency of the assembly, it may take the form of polythene film having a thickness of 0.05 inch. In this case the plates may be made of silver-plated copper in order to reduce heat losses which would occur due to the heavy currents circulating in the screen. Alternatively, polytetrafluoroethylene or silicone rubber could be used.

In the example described above the screen consisting of the plates 3, 4 and 5 gives a considerable attenuation of the harmonic frequencies even when used without the capacitance formed by the plates 6 and 7 and the output capacitance formed by the plates 13 to 15. The connection of the output feed 8 to a single capacitance of large value (which may be either that formed by the plates 6 and 7 or that formed by the plates 13–15) adds a further substantial measure of attenuation. However, the attenuation is again greatly improved when the pick-up coil within the harmonic screen is connected to the first capacitor (the plates 6 and 7) and when an inductance-containing output conductor from this capacitor is connected to the further capacitor constituted by the plates 13–15.

If desired the first of these two capacitors can be formed by the wall of the cavity resonator and a lining or partial lining within the cavity.

When the apparatus described in the drawings is used the attenuation characteristics of one suppression system can be arranged to be to some extent complementary to those of the other suppression systems. Thus in one typical example of apparatus embodying the invention, the generator frequency was 27 mc./s. and the screen around the pick-up coil resonated at about 32 mc./s., giving an extremely good attenuation of the higher harmonics. The capacitance formed by the plates 13 and 14 with the earthed plate 15 was resonant with the inductance-containing output lead 8 at about 21 mc./s., giving good results at the lower harmonic frequencies. The resonant frequency of the pick-up coil circuit was in this case about 12 mc./s.

The screen which has been described is not confined in application to a cavity tank circuit of the equipment but has wide application in all types of industrial high frequency heating equipment. As an example a spiral of conducting material could be provided between the primary and secondary of an output transformer in an induction heating equipment or a low frequency dielectric heating equipment, for example for wood glueing. The inductance of the spiral is self-resonant with the capacitance between the turns of the spiral. The screen should be extended as far as is practical beyond the primary and secondary coils to reduce the leakage around the ends of the screen.

In a further form of equipment of the cavity resonator kind embodying the present invention, a portion of the cavity resonator can be shielded by flat plates connected to alternate ends of the cavity, this portion of the resonator containing an output lead which passes through one end wall to the heating electrodes. As an example, the cavity resonator may be of the kind described in our Patent No. 3,125,656, in which a capacitance unit within the cavity resonator is so arranged to produce a voltage-multiplying effect. Instead of flat plates shielding a section of the cavity resonator the screening elements might be coaxial cylinders or flattened tubes surrounding the output wire or strip. A very high capacitance exists between such coaxial screens. At the fundamental frequency the reactance of the screen is not low enough to reduce appreciably the magnetic flux cutting the conductor. At higher frequencies, however, the reactance of the capacitance between the screen elements is so low that the screen has the electrical effect of a completely conducting cylinder surrounding the output lead. This prevents the magnetic flux at harmonic frequency from cutting the conductor as such flux is converted into current circulating in the screen elements.

The screen which has been described can be introduced into the circuit of the radio frequency equipment at any suitable point. If desired, several successive screen units can be used to achieve improved levels of harmonic attenuation. Thus it is possible to introduce a first screen between coupled coils in the anode circuit of the oscillator valve when the secondary of the coupled coils leads to a cavity circuit which may have a further screen surrounding its pick-up coil. In such a case the anode circuit would be tuned to the same frequency as the cavity and a conventional tuned grid oscillator circuit could be used provided there was good stability in the tuned anode circuit.

I claim:

1. Radiofrequency heating equipment comprising:
a radiofrequency generator;
a coil inductively coupled to said generator for picking up radiofrequency electrical power therefrom;
and a screen shielding said coil, said screen including at least two successive shields of continuous conductive sheet forming a tunnel around said coil and together constituting an electrical capacitance, said shields forming both an electrostatic and an electromagnetic screen, said screen inductance and capacitance being resonant at a frequency which lies between the fundamental and second harmonic of said generator; whereby the magnetically induced voltage at harmonic frequencies is reduced in amplitude to a greater extent than the voltage induced at the fundamental frequency.

2. Equipment according to claim 1, in which the conductive shields forming the tunnel are mounted on a support plate, each shield being connected at one end only to the support plate and being free at the other end, adjacent shields being connected to the support plate at opposite ends.

3. Radiofrequency heating equipment according to claim 1 including a screening enclosure housing said pickup coil and screen:
a capacitor connected between said pickup coil and said screening enclosure and providing a low reactance path to said screen, said pickup coil and said capacitor being resonant at a frequency which is less than the second harmonic frequency of said generator, the equipment further including a work circuit and an output circuit connected to apply the voltage developed across said capacitor to said output circuit for delivery to said work circuit.

4. Equipment according to claim 1, in which the tank circuit of the radio frequency generator is constituted by a cavity resonator.

5. Radiofrequency heating equipment according to claim 1 in which said pickup coil is connected to a first capacitor providing a low reactance path to a screening enclosure, a further capacitor also connected to provide a low reactance path to a screening enclosure, an inductance connecting the live side of said first capacitor to said further capacitor, the resonant frequency of said pickup coil and said first capacitor being below that of said inductance and said further capacitor and the resonant frequencies of both of these being below the fundamental frequency of said generator.

6. Radiofrequency heating equipment according to claim 1 including a support plate, said conductive shields forming said tunnel being mounted on said plate, each shield being connected at one end only to said plate, the opposite end being free, adjacent shields being connected to said support plate at their opposite ends, said support plates serving as one plate of a two-plate capacitor, a duct member, an output conductor within said duct member and connected to said pickup coil, and said duct member forming a support for said two-plate capacitor.

7. Radiofrequency heating equipment comprising:
a radiofrequency generator of the type having a cavity resonator for a tank circuit;
a coil inductively coupled to said cavity for picking up radio frequency electrical power therefrom; and
a screen shielding said coil and including at least two successive shields of continuous conductive sheet material forming a tunnel around said pickup coil and together constituting an electrical capacitance, said shields forming both an electrostatic and an electromagnetic screen, said screen inductance and capacitance being resonant at a frequency which lies between the fundamental and second harmonic frequency of said generator; whereby the magnetically induced voltage at harmonic frequencies is reduced in amplitude to a greater extent than the voltage induced at the fundamental frequency.

8. Equipment according to claim 1, in which the tank circuit of said radiofrequency generator is a cavity resonator and in which an output lead from the cavity extends into a further screening compartment and is connected to the live plate of a further capacitor the other plate of which is earthed.

9. Equipment according to claim 8, in which the earthed plate of the further capacitor is constituted by the wall of the screening compartment.

10. Equipment according to claim 9, in which the further capacitor includes two live plates which are electrically interconnected and are located on opposite sides of the earthed wall of the compartment.

11. Equipment according to claim 10, in which the outer live plate forms part of a variable output capacitor.

12. Equipment according to claim 11, in which variation of the capacitance of the output capacitor is achieved by pivoting its second plate with respect to its first plate.

References Cited

UNITED STATES PATENTS

| | | | |
|---|---|---|---|
| 2,301,423 | 11/1942 | Lindenblad | 333—82 |
| 2,411,299 | 11/1946 | Sloan | 333—82 |
| 2,783,344 | 2/1957 | Warren | 219—10.55 |
| 2,848,631 | 8/1958 | Tibbs | 307—156 |
| 2,868,939 | 1/1959 | Pound | 219—10.55 |
| 2,944,123 | 7/1960 | Tibbs | 219—10.55 |

HERMAN KARL SAALBACH, *Primary Examiner.*

C. BARAFF, *Assistant Examiner.*